Feb. 23, 1965  F. S. BEST  3,170,307
WATER COOLER APPARATUS
Filed Sept. 30, 1963  2 Sheets-Sheet 1
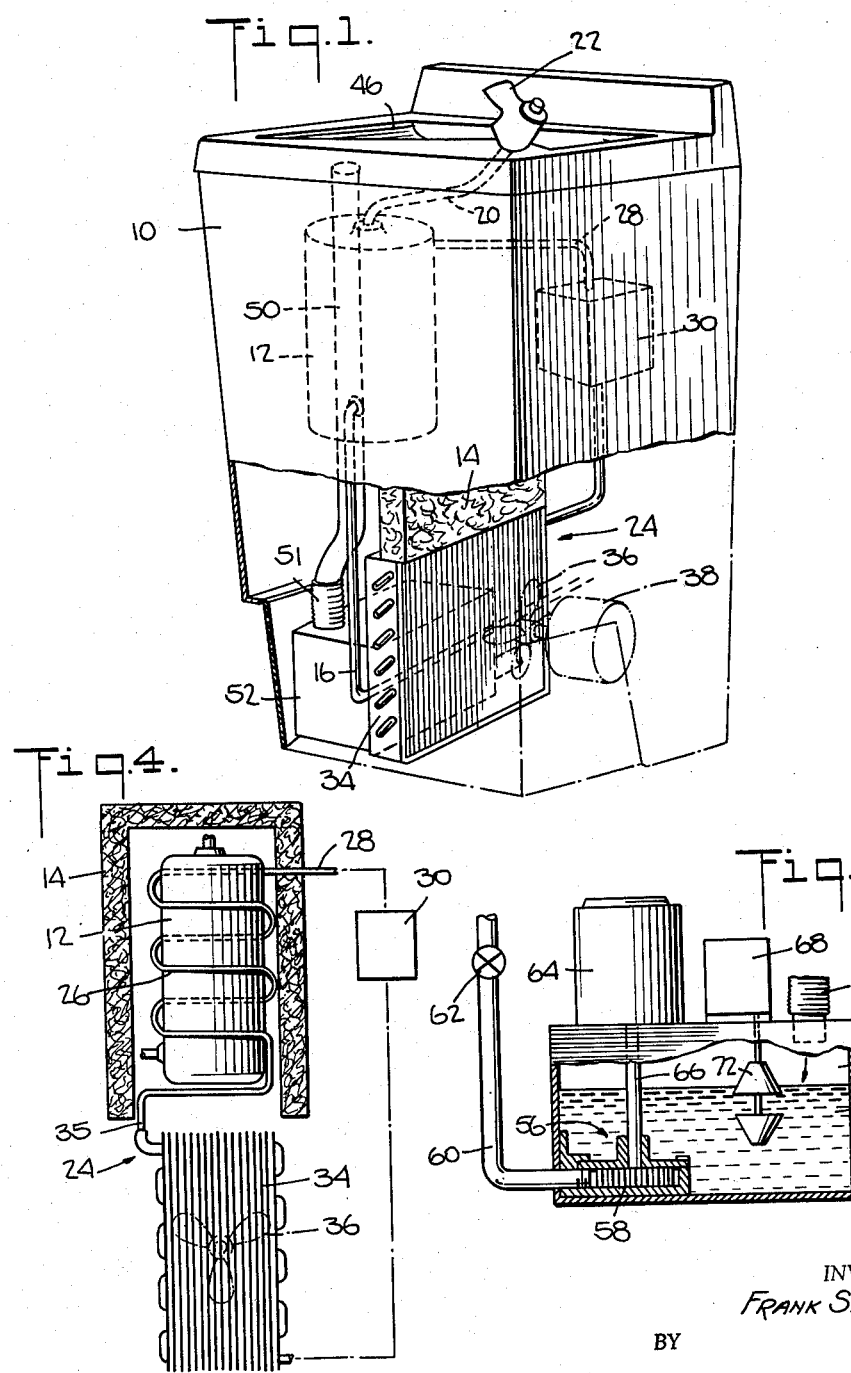
INVENTOR.
FRANK S. BEST
BY
ATTORNEYS

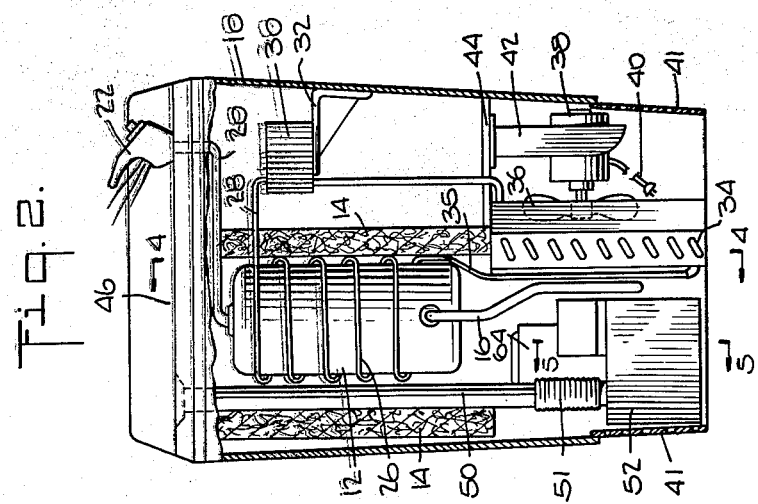
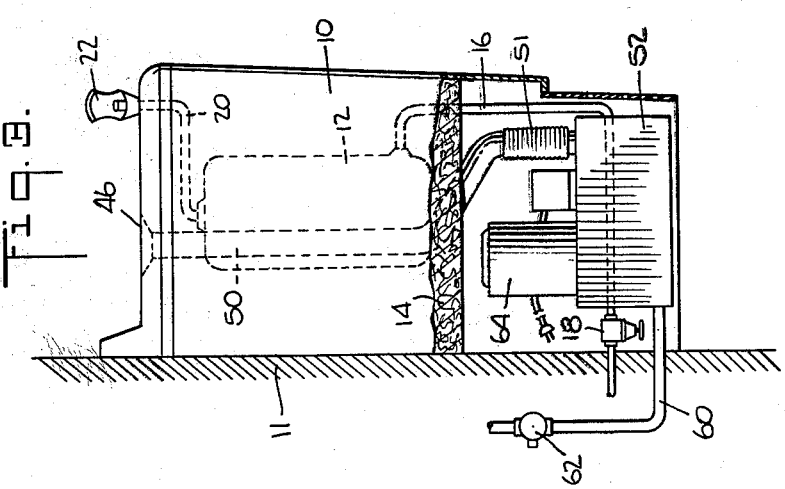

United States Patent Office 3,170,307
Patented Feb. 23, 1965

3,170,307
WATER COOLER APPARATUS
Frank S. Best, Rumson, N.J., assignor to Great Bear Spring Company, New York, N.Y., a corporation of New Jersey
Filed Sept. 30, 1963, Ser. No. 312,615
3 Claims. (Cl. 62—188)

This invention relates to water coolers and more particularly to a method and apparatus for removal of the excess water flowing therefrom. Water coolers embodying the present concept are particularly adapted, among other possible uses, for use in modern factories, commercial buildings, stores, shopping centers and particularly in large one story structures where the plumbing facilities are grouped together in the outer wall.

Heretofore, water coolers commonly in use have been installed closely adjacent existing sewer lines. A difficulty with such prior coolers is that they could not be placed at optimum locations where they would be the most useful such as close to the place of work for a large number of workers in a factory or at convenient locations within a store or shopping center. Hence, valuable time was lost as well as the inconveniences involved. One attempt to overcome this difficulty included the use of separate waste buckets placed at each cooler. However, this had the decided disadvantage of requiring frequent emptying.

In essence, the present invention includes a new and improved water cooler having a housing, cooling means disposed within said housing through which a stream of water is adapted to flow to a bubbler which is located externally of the housing. It should be appreciated that heating means may also be employed, if desired. A collecting pan is disposed adjacent the bubbler which may be constructed integrally with the housing for collecting the excess water flowing from the bubbler. A waste tank is located within the housing preferably towards the lower portion thereof and means are provided establishing fluid flow communication between the pan and the waste tank. The waste tank is provided with outlet means which extend through the housing. Motive means are disposed within the housing adjacent the waste tank and pumping means are provided which are driven by the motive means and are adapted to receive water from the waste tank and deliver it to the outlet under pressure and control means are provided for the motive means which function in response to the fluid elevation in the waste tank.

A feature of the invention resides in the provision of an improved water cooler which substantially increases the number of locations where the cooler may be installed, which does not require the use of a sewer line adjacent thereto, which overcomes the lack of gravity often necessary for the installation of sewer lines in some locations, and which eliminates the necessity of a trap in the waste line adjacent the cooler.

As another feature, the present invention provides an improved water cooler which is simple to install, which is low in maintenance costs, which is adaptable for use with existing equipment and which is compact, convenient, practical and inexpensive.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention. A specific embodiment of the invention has been chosen for purposes of illustration and description, and is shown in the accompanying drawings, forming a part of the specification, wherein:

FIG. 1 is a perspective view showing a water cooler constructed in accordance with the concepts of this invention;

FIG. 2 is a vertical sectional view of the same water cooler;

FIG. 3 is a side elevation, partially broken away, to reveal the means for removal of the waste water;

FIG. 4 is a sectional view taken along the line 4—4 of FIG. 2; and

FIG. 5 is a sectional view taken along the line 5—5 of FIG. 2.

In the illustrated embodiment of the invention, the water cooler includes a housing 10, which may be mounted on a wall 11 (FIG. 3), a pressure tank 12 disposed within the housing and being insulated by means of walls 14 formed of heat insulating material. As best seen in FIG. 3, inlet means for the tank 12 include a pipe 16 which receives drinking water under pressure from a convenient source (not shown) which may be the city water supply, and a valve 18 interposed in the line for the convenience of shutting down the unit for such purposes as effecting repairs. The outlet means for this tank includes a pipe line 20 (FIG. 1) which leads to bubbler 22 which is fixedly attached to the top of housing 10. Since the water enters the tank 12 under pressure and whenever any water is discharged from the bubbler 22 it is immediately replaced, the tank remains always full and under pressure. Means designated generally at 24 are provided for cooling the water in the tank 12. The tank and the cooling means are sized so that even if water is continuously discharged from the bubbler 22, the residence time for the water within the tank is sufficient to cool the water to the desired temperature for drinking purposes. Since the water is under pressure when bubbler 22 is actuated water flows therefrom at a sufficient height for drinking purposes.

The cooling means 24, as illustrated in FIG. 4, comprises a coil 26 surrounding the tank 12 and containing a refrigerant which absorbs heat from the drinking water passing through the tank. The heated refrigerant thence passes through a pipe line 28 to a compressor 30, mounted on the housing 10 by means of a bracket 32 (FIG. 2), and thence to a series of fins 34 wherein the heat is withdrawn from the refrigerant by means of air flowing past the fins. The cooled refrigerant then circulates back up to the coil 26 through a capillary tube 35 and the cycle is repeated. As best seen in FIG. 2, air is blown past the fins 34 by means of fan 36 which is driven by an electric motor 38, power being supplied by electrical line 40. Bracket 42 is carried by cross frame 44 for purposes of supporting the motor 38. Each side of the housing 10 is provided with a grill 41 through which the cooling air passes into and from the housing.

Thus, cool water under pressure is supplied to the bubbler 22. Excess water that is not consumed falls into a collecting pan 46 which may be formed integrally with the housing 10 (FIG. 1). The water flows downwardly by means of gravity from the collecting pan 46 through a waste line 50, through a flexible, plastic tube 51 to a waste tank 52. The waste water 54 is collected in the tank 52 until a predetrmined level has been reached. As best seen in FIG. 5, pumping means designated generally at 56 includes a centrifugal pump 58 which receives waste water from the tank 52 and discharges same through an outlet line 60 through a check valve 62. The centrifugal pump 58 is driven by an electrical motor 64 mounted on the top of the sump which drives the pump through an elongated drive shaft 66. Control means 68 actuate the motor 64 in response to the high and low level of the waste water 54 in the sump 52. They include an electrical switch (not shown) and float means 72. Thus, when the waste water 54 raises the float 72 to a predetermined level, the electric switch closes a circuit and the electric motor 64 starts the pump 58. When the waste water lowers the float 72 to a predetermined level, the electric switch opens the circuit and the electric motor stops. Alternatively, control means 68 may comprise a timing switch which alternately opens the circuit for a selected period of time and then closes the circuit for a period of time depending upon the normal usage of the water cooler.

The waste water is discharged under pressure from the pump 58, through the housing 10 via discharge line 60. Since the volumetric flow is usually relatively small and the water is under pressure, it may be piped via a relatively small diameter pipe line to the sewage or waste line of the building at an area remote from the location of the water cooler.

From the foregoing description it will be seen that I have contributed a novel water cooler which substantially increases the number of locations where the cooler may be installed and which does not require the use of a sewer or waste line adjacent thereto.

It will be understood that various changes in the details, materials and arrangements of parts which have been herein described and illustrated in order to explain the nature of the invention, may be made by those skilled in the art within the principle and scope of the invention, as expressed in the appended claims.

I claim:

1. A water cooler for installation at locations remote from sewer or drain facilities and provided with means for automatically disposing of waste or excess water resulting from the use of the water cooler, said cooler comprising a housing, a bubbler mounted externally on said housing, a tank disposed within said housing through which in operation of said cooler a stream of water is adapted to flow under pressure to said bubbler, refrigeration means surrounding said tank for cooling the water as it passes through said tank, a collecting pan disposed adjacent said bubbler for collecting the excess water flowing therefrom, a waste tank disposed in the lower portion of said housing, a flexible pipe interconnecting said collecting pan with said waste tank, outlet means for said waste tank leading outwardly of said housing, motive means disposed within said housing adjacent said waste tank, pumping means disposed within said waste tank and driven by said motive means for receiving water from said waste tank and delivering it to said outlet means under pressure, said outlet means being connected to said remotely located drain facility, and control means for said motive means having a float operatively responsive to the fluid elevation in said waste tank to start said pump means at one fluid elevation and to stop said pump means at a second higher fluid elevation in said waste tank whereby the fluid level in said waste tank varies between an upper and lower level enabling said water cooler to be installed at any location irrespective of the accessibility of sewer or drain facilities.

2. A water cooler for installation at locations remote from sewer or drain facilities and provided with means for automatically disposing of waste or excess water resulting from the use of the water cooler, said cooler comprising a housing, a bubbler mounted externally on said housing, a tank disposed within said housing through which in operation of said cooler a stream of water is adapted to flow under pressure to said bubbler, refrigeration means surrounding said tank for cooling the water as it passes through said tank, a collecting pan disposed adjacent said bubbler for collecting the excess water flowing therefrom, a waste tank disposed in the lower portion of said housing, a flexible pipe interconnecting said collecting pan with said waste tank, outlet means for said waste tank leading outwardly of said housing, a check valve disposed in said outlet means, motive means disposed within said housing adjacent said waste tank, pumping means disposed within said waste tank and driven by said motive means for receiving water from said waste tank and delivering it to said outlet means under pressure, said outlet means being connected to said remotely located drain facility, and control means for said motive means having a float operatively responsive to the fluid elevation in said waste tank to start said pump means at one fluid elevation and to stop said pump means at a second higher fluid elevation in said waste tank whereby the fluid level in said waste tank varies between an upper and lower level enabling said water cooler to be installed at any location irrespective of the accessibility of sewer facilities.

3. A water cooler for installation at locations remote from sewer or drain facilities and provided with means for automatically disposing of waste or excess water resulting from the use of the water cooler, said cooler comprising a housing, a bubbler mounted externally on said housing, a tank disposed within said housing through which in operation of said cooler a stream of water is adapted to flow under pressure to said bubbler, refrigeration means surrounding said tank for cooling the water as it passes through said tank, a collecting pan disposed adjacent said bubbler for collecting the excess water flowing therefrom, a waste tank disposed in the lower portion of said housing, a flexible pipe interconnecting said collecting pan with said waste tank, outlet means for said waste tank leading outwardly of said housing, an electric motor having an extended drive shaft disposed within said housing adjacent the upper portion of said waste tank, a centrifugal pump driven by said extended drive shaft for receiving water from said waste tank and delivering it to the other end of said outlet means and control means for said electric motor having an electric switch actuated by a float which is responsive to the fluid elevation in said waste tank.

References Cited by the Examiner

UNITED STATES PATENTS

| 2,060,420 | 11/36 | Houck | 62—387 |
| 2,186,900 | 1/40 | Dick et al. | 62—397 X |
| 2,906,834 | 9/59 | Dyer | 103—26 X |
| 3,086,373 | 4/63 | Freer | 62—391 X |
| 3,090,849 | 5/63 | Coulin | 103—26 X |
| 3,091,100 | 5/63 | Sorensen et al. | 62—395 |
| 3,109,294 | 11/63 | Messer | 62—55 |

ROBERT A. O'LEARY, *Primary Examiner.*